United States Patent [19]

Anjier et al.

[11] Patent Number: 4,568,527
[45] Date of Patent: Feb. 4, 1986

[54] UTILIZATION OF PARTIALLY CALCINED ALUMINA AS PRECIPITATION AID IN THE BAYER PROCESS

[75] Inventors: Joseph L. Anjier, Baton Rouge, La.; Richard G. Breuer, Los Gatos, Calif.; Harold L. Butler, Baton Rouge, La.

[73] Assignee: Kaiser Aluminum & Chemical Corporation, Oakland, Calif.

[21] Appl. No.: 668,789

[22] Filed: Nov. 6, 1984

[51] Int. Cl.$^4$ ............................................... C01F 7/14
[52] U.S. Cl. .................................. 423/127; 423/121; 423/629; 23/301; 23/305 A
[58] Field of Search ..................... 423/121, 127, 628; 23/301, 305 A

[56] References Cited

U.S. PATENT DOCUMENTS

| | | | |
|---|---|---|---|
| 3,486,850 | 12/1969 | Day | 423/127 |
| 4,051,222 | 9/1977 | Gnyra | 423/127 |
| 4,234,559 | 11/1980 | Tschamper | 423/127 |
| 4,311,486 | 1/1982 | Yamarla et al. | 423/127 |
| 4,364,419 | 12/1982 | Yamada et al. | 423/127 |
| 4,511,542 | 4/1985 | Anjier et al. | 423/127 |
| 4,512,959 | 4/1985 | Pohland et al. | 423/127 |

Primary Examiner—Herbert T. Carter
Attorney, Agent, or Firm—Andrew E. Barlay

[57] ABSTRACT

Finely divided alumina, recovered from the dust recovery systems of alumina hydrate calcination facilities, is employed as seed for the precipitation of alumina hydrate from pregnant Bayer process liquors. The finely divided alumina dust can either be used as seed in as-is condition, or, if desired, agglomerated to coarse and strong particles prior to use as seed. Agglomeration is accomplished by combining the dust in a predetermined weight ratio with alumina trihydrate seed under controlled conditions. The process allows the utilization of an otherwise undesirable and unacceptable by-product of alumina hydrate calcination.

4 Claims, 2 Drawing Figures

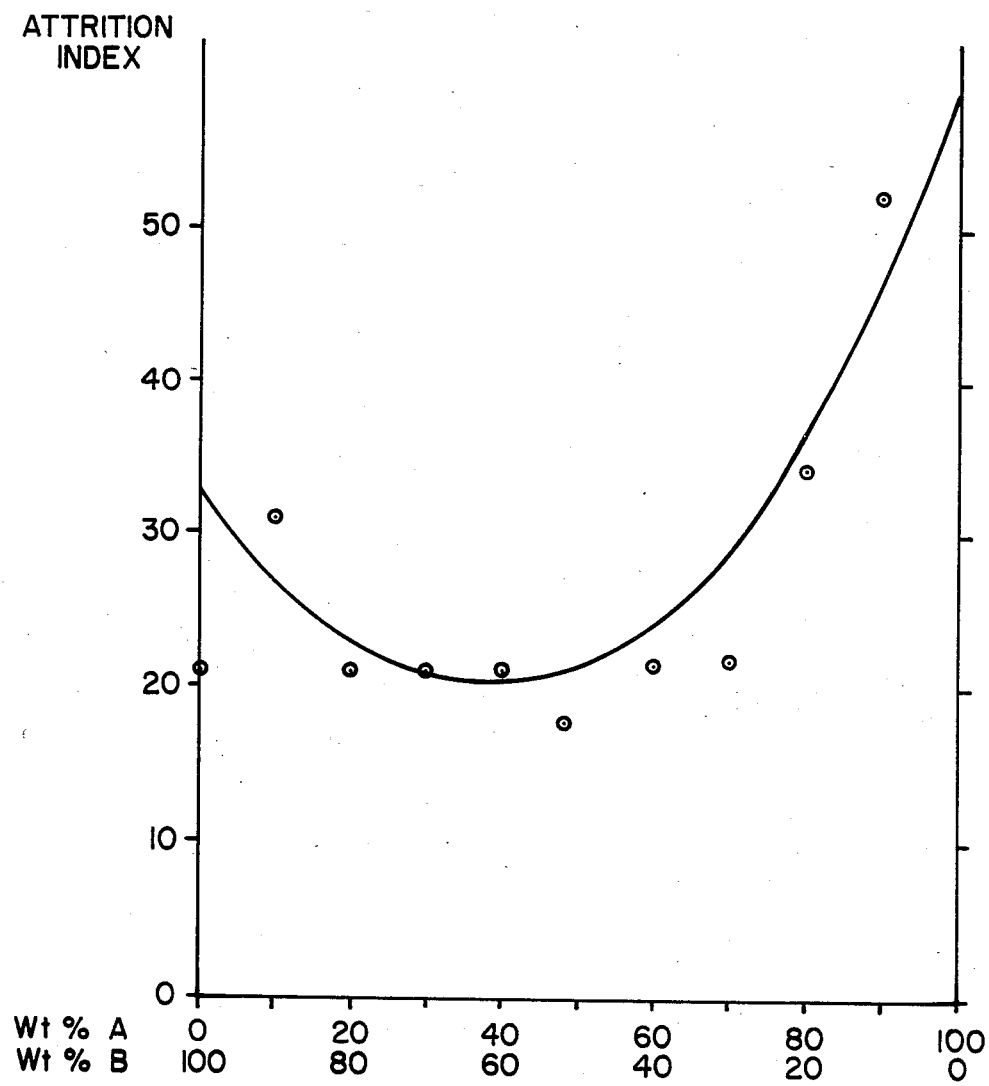
FIG._1.

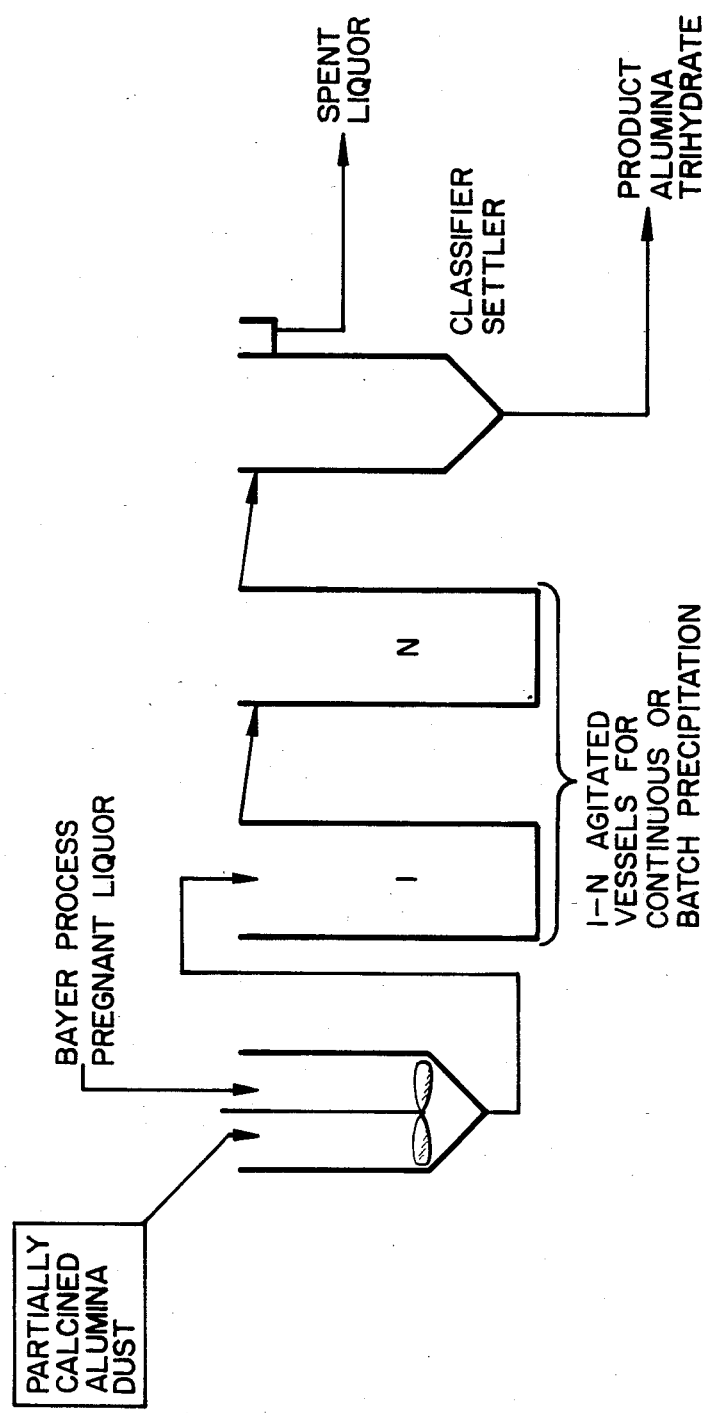
FIG._2.

UTILIZATION OF PARTIALLY CALCINED ALUMINA AS PRECIPITATION AID IN THE BAYER PROCESS

BACKGROUND OF THE INVENTION

Alumina trihydrate or $Al_2O_3.3H_2O$ is generally produced by the well-known Bayer process and its main area of application is in the production of metallic aluminum by electrolytic reduction. Alumina trihydrate, due to its considerable water content, cannot be directly utilized in electrolytic reduction cells. It has to be subjected to a calcination step prior to its use as feed to reduction facilities.

The Bayer process, as it is known, involves the digestion of bauxite in a caustic medium at elevated temperatures and pressures and from the resulting caustic liquor, the dissolved alumina content is recovered by subjecting the liquor to precipitation. Precipitation is generally accomplished by the use of alumina trihydrate seed and the recovered alumina trihydrate after several process stages, such as classification, filtration, and washing, is subjected to a calcination step to remove the major portion of its water content prior to its use as reduction-grade alumina.

It is also known that there are two variations to the Bayer process, the American and the European processes, and these two processes produce alumina trihydrate of varying particle size distribution and strength. While the American Bayer process generates coarse alumina hydrate particles, the European type process results in considerably finer hydrate grains. Calcination of these two types of hydrates also results in different products. For example, calcination of the hydrate produced by the American type Bayer process results in a relatively coarse alumina, often designated as "sandy" alumina; while the alumina obtained by the calcination of the hydrate generated by the European type Bayer process is a much finer product, characterized by a "floury" appearance and properties. When these hydrates are calcined in conventional calcination equipment, such as rotary kilns or fluidized bed furnaces, a relatively large quantity of dust will be generated due to thermal shock and/or attrition affecting both the American type coarse alumina hydrate and the European type hydrate, which hydrate is already finely divided. These fines, to avoid air pollution and product losses, must be retained in the calcination system. This is generally accomplished by the use of dust collectors, such as electrostatic precipitators or the like, and the recovered partially calcined alumina dust is commonly referred to as electrostatic or ESP dust.

The recovered alumina dust is generally characterized by a particle size distribution wherein particles of less than 44 microns in size dominate, most commonly 90% by weight or more of the alumina has a size below 44 microns. Additionally, the dust is a mixture of calcined, partially calcined and uncalcined particles and, consequently, the water content of the individual particles as determined by loss on ignition (LOI) test can vary between wide limits, for example, between about 1 and 35% by weight. These properties of the alumina dust render it a waste material and its disposal creates several problems since the dust can amount to about 5–10% relative to the total quantity of alumina recovered from the calciner. In the case of a calcining facility having an annual calcined alumina output of 500,000 metric tons per year, the alumina dust loss can amount to 25–50,000 tons per year. To at least reduce this significant by-product loss at certain calcination facilities, a portion of the generated alumina dust is blended with the calcined alumina product. Blending, however, cannot eliminate the problem since the calcined alumina product always contains particles of less than 44 micron size and the percentage of the less than 44 micron size alumina cannot be increased beyond a certain acceptable limit set by the operators of reduction facilities. Thus, only a portion, and generally only a small fraction, of alumina dust can be utilized since in addition to the particle size, the LOI of the dust can also detrimentally affect the quality of the calcined alumina. Another method of reducing the accumulated quantity of alumina dust is to recycle the dust to the digestion step where it is redissolved in caustic to form alumina trihydrate which is then recovered by precipitation. This method, while capable of handling the alumina dust problem, is economically disadvantageous since redissolution requires additional processing and the overall productivity of the Bayer plant is reduced in direct relationship with the quantity of redissolved alumina dust.

It has also been suggested in U.S. Pat. No. 4,051,222—Gnyra (Sept. 27, 1977) to coarsen alumina dust produced in calciners for reuse in the Bayer process. Coarsening or agglomeration of the dust by the process described in this patent is accomplished by admixture with Bayer process pregnant liquor and calcium carbonate in an aqueous medium. The produced slurry containing up to about 50 grams calcium carbonate per liter of pregnant liquor is used as seed for alumina trihydrate precipitation from pregnant Bayer process liquor. Although this prior art process allows the utilization of a portion of the partially calcined alumina dust, the employment of calcium carbonate as an agglomerating or coarsening agent generates significant problems. These problems originate from the introduction of a calcium-containing compound into the pregnant liquor. The compound under the precipitation conditions envisioned can form calcium aluminate. Additionally, the carbonate constituent of the calcium compound may react with the caustic content of the liquor resulting in the formation of undesired sodium carbonate.

In U.S. Pat. No. 4,311,486—Yamada et al (Jan. 19, 1982), alumina hydrate is precipitated from Bayer process pregnant liquor by adding as seed finely divided alumina hydrate having an average particle size of less than 10 microns. This fine alumina hydrate is recovered from precipitated alumina hydrate by classification or by addition of aluminum hydroxide gel to supersaturated sodium aluminate solution. This process is limited in its application since it can only employ alumina hydrate for the seeding operation and not the partially calcined dust, which hydrate must be obtained prior to calcination by classification. Also, since the average particle size recommended for seeding is about 10 microns or less, this requires an extensive separation process and no provision is made for the alumina hydrate falling within the 10–44 micron range. Consequently, this prior art process cannot be applied to the elimination of the alumina dust problem.

It has now been found that the quantity of partially calcined alumina dust which is generated in alumina hydrate calcination facilities can be significantly reduced. This is accomplished by using the partially calcined alumina for precipitating alumina hydrate from supersaturated Bayer process pregnant liquors. Precipitation is accomplished by using either the partially calcined alumina as seed under predetermined conditions or by admixing the partially calcined alumina with conventionally utilized alumina hydrate seed material in a predetermined ratio. The alumina hydrate which precipitates from the liquor seeded with the partially calcined alumina exhibits coarseness and strength and can be subjected to calcination without undue formation of unacceptable fines.

SUMMARY OF THE INVENTION

Alumina dust generated during the calcination of alumina trihydrate is employed as seed either in the as-is condition or in combination with conventionally utilized seed to precipitate coarse and strong alumina trihydrate from Bayer process pregnant liquors. The quantity of alumina dust utilized for precipitation is usually established by providing a 2–10 m$^2$ seed surface per liter of pregnant liquor. The recovered alumina trihydrate exhibits excellent attrition resistance and the desired particle size wherein 90% or more by weight of the trihydrate produced has a size in excess of 44 microns. The process allows reduction of fine generation, as well as the gradual reduction of already produced dust.

BRIEF DESCRIPTION OF THE DRAWING

FIG. 1 graphically shows the attrition resistance of alumina hydrate precipitated from Bayer process pregnant liquors using various quantities of partially calcined alumina dust recovered from an alumina hydrate calciner.

FIG. 2 provides a schematic presentation of the precipitation system employing an advantageous embodiment of the process by using a mixture of partially calcined alumina dust and conventional alumina hydrate seed material as seed for the precipitation of coarse and strong alumina hydrate from Bayer process pregnant liquor.

DETAILED DESCRIPTION OF THE INVENTION

This invention relates to the utilization of the partially calcined alumina dust by-product generated in the calcination of alumina hydrate, such as precipitated from Bayer process pregnant liquors.

For the purposes of this invention, the terms "dust", "partially calcined alumina dust", "alumina dust", or "ESP dust" as used herein, all refer to an alumina dust by-product which is generated when alumina hydrate is calcined at temperatures in excess of about 500° C. These "dust" by-products are further characterized by a particle size distribution wherein particles of less than 44 micron in size constitute not less than about 95% by weight of the dust and about 50–70% by weight of the particles have a size less than 20 microns. The terms "alumina hydrate", "alumina trihydrate", and "hydrate" as used herein refer to an alumina having the formula $Al_2O_3 \cdot xH_2O$, where x is equivalent to 1–3. The terms "calcined" or "reduction-grade" alumina refer to a calcined alumina product having a particle size distribution wherein at least about 95% by weight of the particles have a size in excess of 44 microns and a loss on ignition of less than about 5% by weight.

In accordance with the instant process, alumina dust generated during calcination of alumina hydrate in calcination devices and recovered in conventional dust recovery systems, such as electrostatic precipitators, filters, cyclone separators, and the like, is converted to a usable product.

In the process of the invention, the alumina dust is converted to a usable product either by agglomeration without additives or by the formation of a homogeneous seed for alumina hydrate precipitation. This latter alternative involves admixing of the alumina dust with fine alumina hydrate and the use of this mixture for the precipitation of strong alumina hydrate agglomerates.

In accordance with the process of the invention and as shown in FIG. 2, alumina dust is either batchwise or in a continuous manner charged into an agitated vessel. At the same time, the vessel is also charged with pregnant Bayer liquor. The pregnant Bayer liquor to be contacted with the alumina dust has generally a caustic concentration (expressed as $Na_2CO_3$ grams/liter) in the range from about 160 g/l to about 300 g/l and a sufficient alumina ($Al_2O_3$ g/l) concentration to provide an alumina/caustic (A/C) weight ratio in the range from about 0.60 to about 0.75. The temperature of the pregnant liquor introduced into the agitated vessel is usually within the temperature range from about 51° C. (125° F.) to about 82° C. (180° F.). Agitation of the vessel is accomplished by conventional means. The quantity of alumina dust to be added as seed to the pregnant liquor depends on the surface area of the dust. Generally, it is preferred that the ratio of seed surface area to the volume of pregnant liquor should be within the range from about 1 to about 10 m$^2$/l, preferably from about 2 to about 8 m$^2$/l of liquor. The seeded pregnant liquor is, if desired, transferred into one or more precipitation vessels where precipitation of alumina trihydrate will take place. Average residence times of about 1 to about 18 hours are utilized at temperatures within the range from about 52° C. to about 85° C. (125° F. to 185° F.).

Under these conditions, a strong and coarse agglomerated alumina trihydrate will be produced characterized by a particle size distribution wherein more than about 90% by weight of the particles have a size in excess of 44 microns. The produced alumina hydrate not only exhibits the preferred particle size, but it is also strong and does not provide excess fines by attrition when subjected to calcination to produce reduction-grade alumina.

In an advantageous variation of the inventive process, the alumina dust, prior to its use as seed for precipitation, is admixed with conventionally employed alumina trihydrate seed and then this admixture is utilized for the precipitation of alumina trihydrate from Bayer process pregnant liquor. In the admixture of alumina dust and trihydrate seed, the quantity of dust is generally 40–80% by weight, preferably 45–55% by weight of the total. This admixture can be introduced into the pregnant liquor as seed; in a preferred alternative, the admixture and the pregnant liquor are simultaneously metered into an agitated vessel to assure good mixing and then this mixture is charged into one or more conventional precipitators. The ratio of total seed surface area to the volume of pregnant liquor is selected to be within the 2–10 m$^2$/liter range, preferably within the 3–6 m$^2$/l range. Naturally, these limits can be varied depending upon the A/C ratio of the pregnant liquor. However, within the conventionally utilized limits, e.g., 0.60–0.75 A/C ratios, the above referred-to range can be advantageously utilized. The conditions of precipitation, i.e., temperature, residence time, and other variables, are not affected by the utilization of the alumina dust as seeding material. Thus, the use of alumina dust as seeding material for pregnant Bayer process liquors allows Bayer plant operators to continue to utilize their customary precipitation techniques without any detrimental effect on the yield or quality of the produced alumina trihydrate.

The products generated by the application of alumina dust in combination with conventional seed are coarse, strong, and of acceptable particle size distribution. The strength of the alumina hydrate product is generally determined by measuring attrition properties. Resistance to attrition indicates the expected behavior of the alumina hydrate during calcination as far as breakdown and dust formation are concerned. The strength of the hydrate ie expressed by an attrition index which can be determined by using suitable measuring devices. The products generated by the present invention exhibit the desired attrition resistance and, consequently, not only allow the substantial reduction, if not the elimination of unusable alumina dust, but also reduction and gradual elimination of alumina dust produced prior to the application of the instant process.

In the following examples, the advantages of the instant invention are further illustrated.

EXAMPLE I

Partially calcined alumina dust recovered from the electrostatic precipitators attached to an alumina trihydrate calciner was employed in as-is condition as seed for the precipitation of alumina trihydrate. The alumina dust had a particle size wherein 95.35% by weight of the total had a size less than 44 microns. The loss on ignition of the dust was 2.3% when ignited at 1000° C. for 1 hour. The surface area of the dust as measured by the conventional Fisher subsieve instrument was 3936 cm$^2$/g. The dust was charged to Bayer process pregnant liquor having an A/C ratio of 0.67-0.72 and a caustic concentration expressed as g/l Na$_2$CO$_3$ of 165-220 g/l. The precipitation test was conducted with 5, 10, and 20 grams of dust per liter of pregnant liquor. These seed charges provided an approximate seed surface area per liter of pregnant liquor of 2, 4, and 8 m$^2$/l, respectively. The seeded liquors were kept at about 79° C. (175° F.) for a period of about 17-18 hours. Then the precipitated alumina trihydrates were separately recovered and subjected to particle size analysis using a Standard U.S. sieve. The results of the size analysis are shown in the Table below:

| Screen Size of pptd. alumina hydrate in mesh in wt. % | Seed charge in m$^2$/l | | |
|---|---|---|---|
| | 2 | 4 | 8 |
| +100 | 52 | •18 | 11 |
| +200 | 97 | 89 | 83 |
| +325 | 99 | 99 | 97 |
| −325 | 1 | 1 | 3 |

It can be observed that the alumina trihydrate precipitated from pregnant Bayer liquor was of the desired coarse nature and that the use of the alumina dust as seed produced satisfactory products. Calcination of the alumina trihydrate produced a satisfactory reduction-grade alumina of suitable attrition resistance and during calcination of the trihydrate no excessive dust formation indicating excessive attrition was observed.

EXAMPLE II

In this example, the combination of alumina dust and conventional trihydrate seed was tested for the production of coarse, attrition-resistant calcined alumina. The testing involved using different alumina dust-seed weight ratios in the precipitation, followed by determination of the attrition resistance of the produced trihydrates.

The precipitation of the alumina trihydrate was accomplished in a system such as shown in FIG. 2. Alumina dust recovered from electrostatic precipitators commonly employed in combination with alumina trihydrate calciners was utilized. The alumina dust was characterized by a surface area of 11,200 cm$^2$/g, a loss on ignition of 1% by weight and a particle size distribution wherein 99.3% by weight of the total had a size below 44 microns. The conventional trihydrate seed had a surface area of 1315 cm$^2$/g and 36.5% by weight of the seed had a particle size in excess of 44 microns, the balance below 44 microns. Alumina dust-seed weight ratios in the range of 1:9 to 9:1 were employed and these mixtures were utilized in the precipitation tests. The quantity of combined seed was selected to obtain a seed to pregnant liquor surface area within the range of 2 to 10 m$^2$/liter. In the test, a Bayer process pregnant liquor having an A/C ratio of 0.676 was utilized at a caustic concentration of 201 g/l (expressed as Na$_2$CO$_3$ g/l). Precipitation was conducted at about 77° C. and the average residence time was about 24 hours. Subsequent to the precipitation, the produced hydrates were recovered and tested for particle size and attrition resistance. The attrition resistance test results are graphically represented in FIG. 1. Attrition resistance was measured by a modified Forsythe-Hertwig apparatus described and shown in detail on pages 199-209 of *Light Metals* (1982).

It can be observed from FIG. 1 that the highest attrition resistance (i.e., lowest rate of attrition) was obtained with a dust-alumina seed mixture containing 35-80% by weight alumina dust. Best results were found under the selected precipitation conditions when the alumina dust was within the 40-60% by weight range.

We claim:

1. In the process of precipitating alumina trihydrate by the use of a seed material from Bayer process pregnant liquors generated by the high temperature-high pressure digestion of bauxite in a caustic medium, the improvement which comprises employing as seed material a partially calcined alumina derived from the dust recovery system of alumina trihydrate calcination facilities for precipitating coarse and attrition-resistant alumina trihydrate from a pregnant liquor having an alumina-to-caustic weight ratio in the range from about 0.60 to about 0.75 and a caustic concentration in the range from about 160 to about 300 grams/liter expressed as Na$_2$CO$_3$ grams/liter, the partially calcined alumina dust being characterized by a particle size distribution wherein not less than about 95% by weight of the particles have a size of less than about 44 microns and about 50-70% by weight having a size less than 20 microns the alumina dust being employed as seed in a seed surface to pregnant liquor volume ratio in the range from about 2 to about 10 m$^2$/liter; maintaining the seeded liquor at a temperature from about 52° to about 85° C. for an average residence time from about 1 to about 18 hours; and recovering a precipitated alumina trihydrate product having a particle size distribution, wherein 90% by weight or more of the alumina trihydrate particles have a size in excess of 44 microns.

2. A process according to claim 1, wherein the alumina dust, prior to being employed as seed for Bayer process pregnant liquors, is admixed with conventional alumina trihydrate seed in a weight ratio from about 2:3 to about 4:1 and the admixture is utilized for the precipitation of coarse alumina trihydrate product.

3. The process of claim 2, wherein the alumina dust content in the admixture is from about 45 to about 55% by weight.

4. Process according to claim 1, wherein the ratio of seed surface to pregnant liquor volume ratio is kept in the range from about 3 to about 6 $m^2$/liter.

* * * * *